United States Patent
Park

(10) Patent No.: US 11,558,076 B2
(45) Date of Patent: Jan. 17, 2023

(54) ELECTRONIC DEVICE WITH POP-UP MODULE DRIVING STRUCTURE AND METHOD FOR DRIVING THEREOF

(71) Applicant: Samsung Electronics Co., Ltd., Gyeonggi-do (KR)

(72) Inventor: Sungeun Park, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 19 days.

(21) Appl. No.: 17/117,252

(22) Filed: Dec. 10, 2020

(65) Prior Publication Data

US 2021/0175920 A1 Jun. 10, 2021

(30) Foreign Application Priority Data

Dec. 10, 2019 (KR) .................. 10-2019-0163638

(51) Int. Cl.
*H04B 1/3888* (2015.01)
*H04M 1/02* (2006.01)

(52) U.S. Cl.
CPC ........ *H04B 1/3888* (2013.01); *H04M 1/0264* (2013.01); *H04M 2250/12* (2013.01)

(58) Field of Classification Search
CPC .................................................. H04B 1/3888
See application file for complete search history.

(56) References Cited

U.S. PATENT DOCUMENTS

| 2005/0210417 | A1* | 9/2005 | Marvit | G06F 1/1613 |
| | | | | 715/863 |
| 2007/0013805 | A1* | 1/2007 | Suk | H04N 5/23203 |
| | | | | 348/347 |
| 2010/0202650 | A1* | 8/2010 | Park | H04M 1/03 |
| | | | | 381/387 |
| 2011/0045877 | A1* | 2/2011 | Ahn | H04M 1/0216 |
| | | | | 455/575.1 |

FOREIGN PATENT DOCUMENTS

| CN | 205545404 U | 8/2016 |
| CN | 207869164 U | 9/2018 |
| CN | 110071988 A | 7/2019 |
| JP | 2002-271469 A | 9/2002 |
| JP | 2003-188968 A | 7/2003 |
| KR | 10-0801147 B1 | 2/2008 |

OTHER PUBLICATIONS

International Search Report dated Mar. 30, 2021.

* cited by examiner

*Primary Examiner* — Hsinchun Liao
(74) *Attorney, Agent, or Firm* — Cha & Reiter, LLC

(57) ABSTRACT

An electronic device and method are disclosed. The electronic device includes a main body housing, a pop-up module extendable and retractable from the main body housing, and a processor. The processor implements the method, including identifying, by at least one processor, a state where a pop-up module of the electronic device is extended to an external environment of the electronic device, based on receiving a first control signal, maintaining extension of the pop-up, based on receiving a second control (Continued)

signal, retracting the pop-up module into the electronic device, and based on receiving a third control signal indicating that the electronic device is in free fall, retracting the pop-up module into the electronic device.

10 Claims, 22 Drawing Sheets

ELECTRONIC DEVICE WITH POP-UP MODULE DRIVING STRUCTURE AND METHOD FOR DRIVING THEREOF

CROSS-REFERENCE TO RELATED APPLICATION(S)

This application is based on and claims priority under 35 U.S.C. 119 to Korean Patent Application No. 10-2019-0163638, filed on Dec. 10, 2019, in the Korean Intellectual Property Office, the disclosure of which is herein incorporated by reference in its entirety.

TECHNICAL FIELD

Certain embodiments of the disclosure relate to a structure and method for protecting a pop-up module which is popped up when an electronic device falls.

BACKGROUND

An electronic device may include a pop-up module, which may be elevated or stowed respective to a main body housing. For example, the pop-up module may be an external accessory, and include components such as a camera module, an audio device, or modules for various additional function. For example, if the camera module is mounted on the pop-up module, the mounted camera module may be used as a front camera or a rear camera when the pop-up module is elevated ("popped up"), and may be protected by the main body housing when the pop-up module is stowed ("popped down") within the main body housing.

SUMMARY

A pop-module may be formed so as to be popped up or popped down by a specific movement distance and velocity, with respect to the main body housing, using an additional driver. For example, the driver may include a motor and a driving device. The driving device may transfer power of the motor to the pop-up module. The pop-up module may be popped up or popped down by means of the driving device.

However, when the electronic device is accidentally dropped while the pop-up module is elevated, the pop-up module can be seriously damaged due to its exposure to the external environment of the device. This may result in mechanical failure, poor operation, or poor functionality in the pop-up module.

Certain embodiments of the disclosure provide a structure and method for protecting a pop-up module from an external environment such that, upon recognizing that the electronic device is in a free fall state, the pop-up module is automatically retracted into a main body housing, before the electronic device collides with the ground.

Certain embodiments of the disclosure may include an electronic device, including: a main body housing, and a pop-up module that is extendable and retractable from the main body housing; and a pop-up driving unit coupled to the main body housing, the driving unit interoperating with the pop-up module to provide mechanical force to extend and retract the pop-up module by a first distance from the main body housing, an unlocking unit actuatable to release a locking state of the pop-up module by additionally extending the pop-up module past the first distance when the electronic device is falling, and a first elastic body disposed between the main body housing and the pop-up module, the first elastic body providing a force by which the pop-up module is retracted into the main body housing after the locking state is released by the unlocking unit.

Certain embodiments of the disclosure may include an electronic device, including: a pop-up module including a camera that can be extended from and retracted into the electronic device, a driving unit configured to actuate extension and retraction of the pop-up module, a sensor unit configured to detect when the electronic device is falling, and at least one processor, configured to: control the driving unit to extend the pop-up module out of the electronic device based on receiving a first control signal, control the driving unit to retract the pop-up module into the electronic device based on a second control signal, and control the driving unit to retract the pop-up module into the electronic device based on a third control signal generated upon detecting, by the sensor unit, that the electronic device is falling.

Certain embodiments of the disclosure may include a method in an electronic device, including: identifying, by at least one processor, a state where a pop-up module of the electronic device is extended to an external environment of the electronic device, based on receiving a first control signal, maintaining extension of the pop-up, based on receiving a second control signal, retracting the pop-up module into the electronic device, and based on receiving a third control signal indicating that the electronic device is in free fall, retracting the pop-up module into the electronic device.

According to certain embodiments of the disclosure, when an electronic device having a pop-up module in an extended state falls (e.g., due to a user's mistake), the pop-up module is automatically retracted to the inside of a main body housing before colliding with the ground, thereby protecting the pop-up module from impact damage.

DETAILED DESCRIPTION

Figure 1:
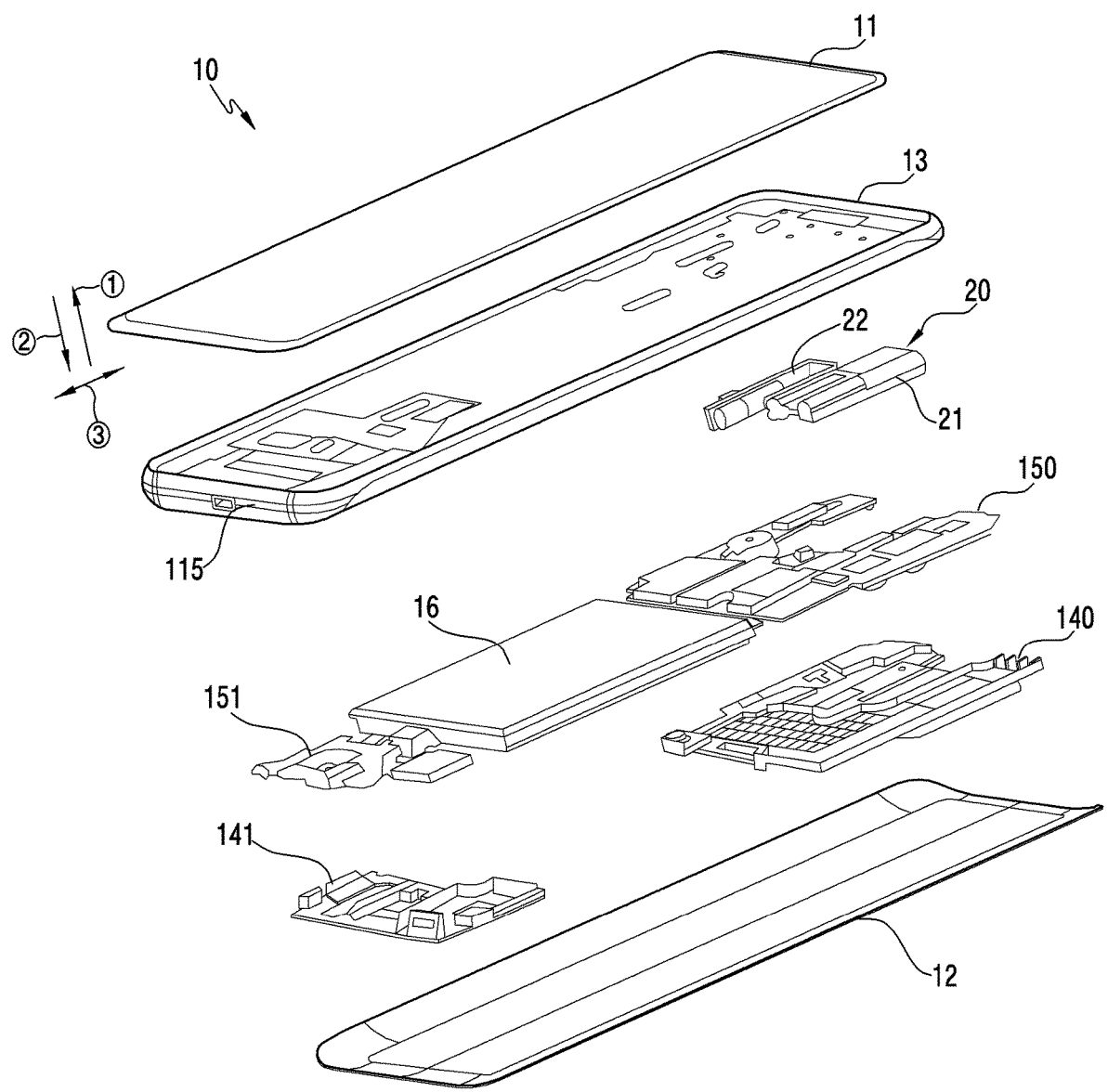
FIG. 1 is an exploded perspective view illustrating an internal structure of an electronic device according to certain embodiments of the disclosure.

Hereinafter, certain embodiments of the disclosure are described with reference to the accompanying drawings. However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements.

FIG. 1 is an exploded perspective view illustrating an internal structure of an electronic device according to certain embodiments of the disclosure.

Referring to FIG. 1, an electronic device 10 according to certain embodiments of the disclosure may include at least one of, for example, a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), electronic clothes, an electronic bracelet, an electronic necklace, an electronic appcessory, an electronic tattoo, a smart mirror, or a smart watch).

According to an embodiment, the electronic device 10 may include a main body housing 100 and a plurality of components accommodated in the main body housing 100. For example, the plurality of components may include at least one circuit board 15, a battery 16, and a pop-up module driver 20.

According to an embodiment, the main body housing 100 may include a first plate 11, a second plate 12, a side member 115, and at least one or more cases 13 and 14. According to an embodiment, the main body housing 100 may include the first plate 11 disposed in a first direction ①, the second plate 12 disposed in a second direction ② opposite to the first direction ①, and the side member 115 disposed in a third direction ③ respectively perpendicular to the first and second directions ① and ②.

According to an embodiment, the first plate 11 may include a window. For example, the window may include a glass material or a synthetic resin material, as a transparent material. According to an embodiment, the first plate 11 may further include a display module (not shown). For example, the display module may include a flat display module, a curved display module, and a combination thereof, or may include a display module implemented using a rigid material or a display module implemented using a flexible material.

According to an embodiment, the second plate 12 may include a back cover. For example, the second plate may include a glass material or a synthetic resin material. According to an embodiment, the second plate 12 may include a flat or curved shape, or a combination thereof.

According to an embodiment, the at least one or more cases 13 and 14 may include the front case 13 and the rear case 14. According to an embodiment, the front case 13 may be disposed between the first plate 11 and the second plate 12, and the rear case 14 (or 140, 141) may be disposed between the front case 13 and the second plate 12. According to an embodiment, the at least one circuit boards 15, the battery 16, and the pop-up module driver 20 may be included between the front case 13 and the rear case 14. According to an embodiment, the front case 13 and the rear case 14 may be coupled to each other, and may include internal component supports being coupled to each other. For example, the support may fix the first and second plates 11 and 12, the pop-up module driver 20, the battery 16, and the at least one circuit board 15 to an inner portion of the main body housing 100.

According to an embodiment, the pop-up module driver 20 may include a pop-up module 21 and a driving unit 22. According to an embodiment, the pop-up module 21 and the driving unit 22 are disposed in a parallel state without overlapping each other, and may be disposed between the front case 13 and the rear case 14. According to an embodiment, the pop-up module 21 may be popped up (e.g., extended from the case) or popped down (e.g., retracted into the case) in the third direction ③ due to the driving of the driving unit 22.

FIG. 2 is an example view sequentially illustrating a state where a pop-up module is popped down when an electronic device falls according to certain embodiments of the disclosure.

Figures 2A, 2B, 2C:
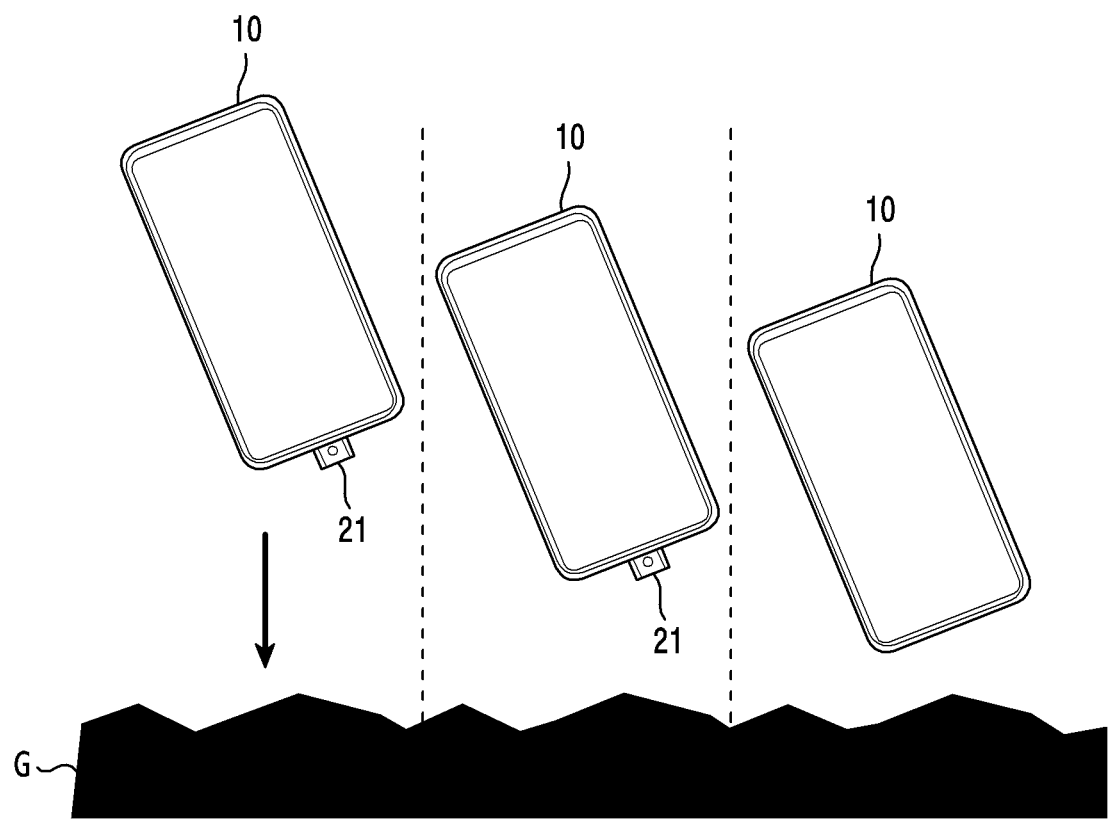
FIG. 2A, FIG. 2B and FIG. 2C are an example views sequentially illustrating a state where a pop-up module is popped down when an electronic device falls according to certain embodiments of the disclosure.

Referring to FIG. 2A, an electronic device 10 in which a pop-up module 21 is popped up according to an embodiment, may free fall to the ground due to an accident (e.g., a user's mistake).

Referring to FIG. 2B, the electronic device 10 according to an embodiment may detect a free fall state of the electronic device 10 using a sensor, such as, for example, any one of an acceleration sensor, a gyro sensor, and an atmospheric pressure sensor.

Referring to FIG. 2C, in the electronic device 10 has detected the falling state, and actuates the driving unit 22 of the pop-up module 21 so as to be retract the pop-up module 21 before striking the ground, thereby protecting the pop-up module 21 from impact damage.

Figure 3A:
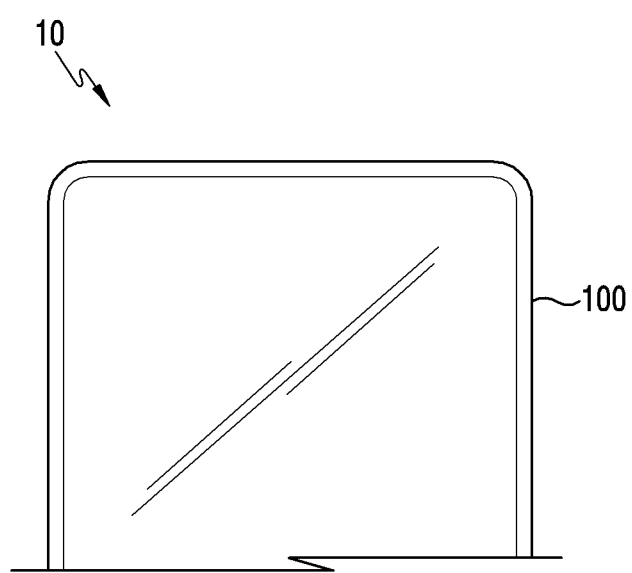
FIG. 3A is an example view schematically illustrating an operation of a pop-up module of an electronic device according to certain embodiments of the disclosure.
Figure 3B:
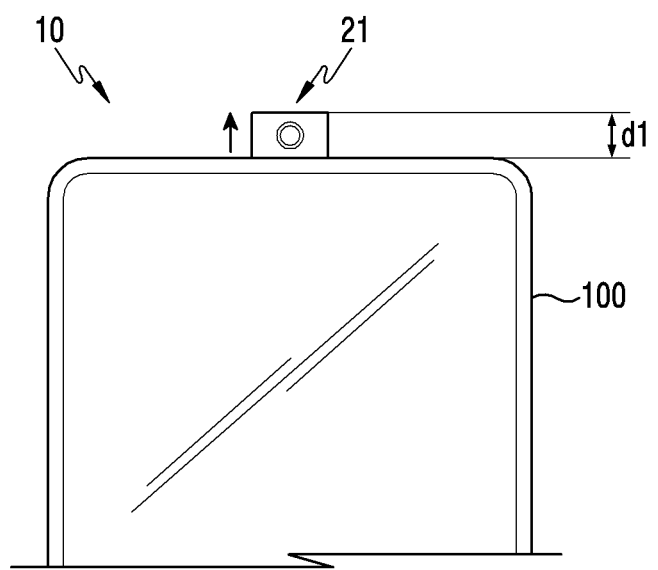
FIG. 3B is an example view schematically illustrating an operation of a pop-up module of an electronic device according to certain embodiments of the disclosure.
Figure 3C:
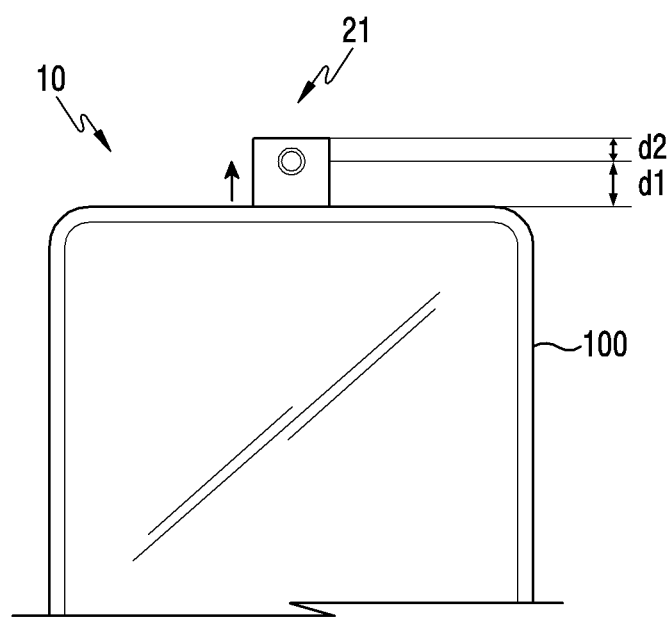
FIG. 3C is an example view schematically illustrating an operation of a pop-up module of an electronic device according to certain embodiments of the disclosure.

FIG. 3A to FIG. 3C are example views schematically illustrating an operation of a pop-up module of an electronic device according to certain embodiments of the disclosure.

Referring to FIG. 3A, when a pop-up module 21 according to an embodiment is not used, the pop-up module 21 may be popped down to the inside of the main body housing 100, thereby being protected from an external environment.

Referring to FIG. 3B, when the pop-up module 21 is in a driving mode, the pop-up module 21 may be popped up from the main body housing by a first distance d1 by using a first control signal generated in the driving unit 22. In the illustrated example, the pop-up module 21 may include, for example, a camera module. Since the camera module is now exposed, pictures may be captured.

Referring to FIG. 3C, when the pop-up module 21 is in the pop-up state, and the electronic device 10 detects a free fall state (i.e., by means of an acceleration sensor of a sensor unit 1606 of FIG. 16 described below), an additional pop-up (i.e., extension) may occur by a second distance d2 according to a second control signal generated by the driving unit 22 of the pop-up module 21. For example, the second distance d2 may be less than the first distance d1. According to an embodiment, when the pop-up module 21 is additionally extended by the second distance d2 due to the operation of the driving unit 22, a locking state of the driving unit 22 may be released.

Returning to FIG. 3A, according to an embodiment, since the pop-up module 21 is retracted completely to the inside of the main body housing 100 according to a third control signal while the locking state is released, the pop-up module 21 may be protected via the main body housing 100.

Hereinafter, the driving unit 22 of the pop-up module 21 disposed to the electronic device 10 will be described with reference to the accompanying drawings.

Figure 4:
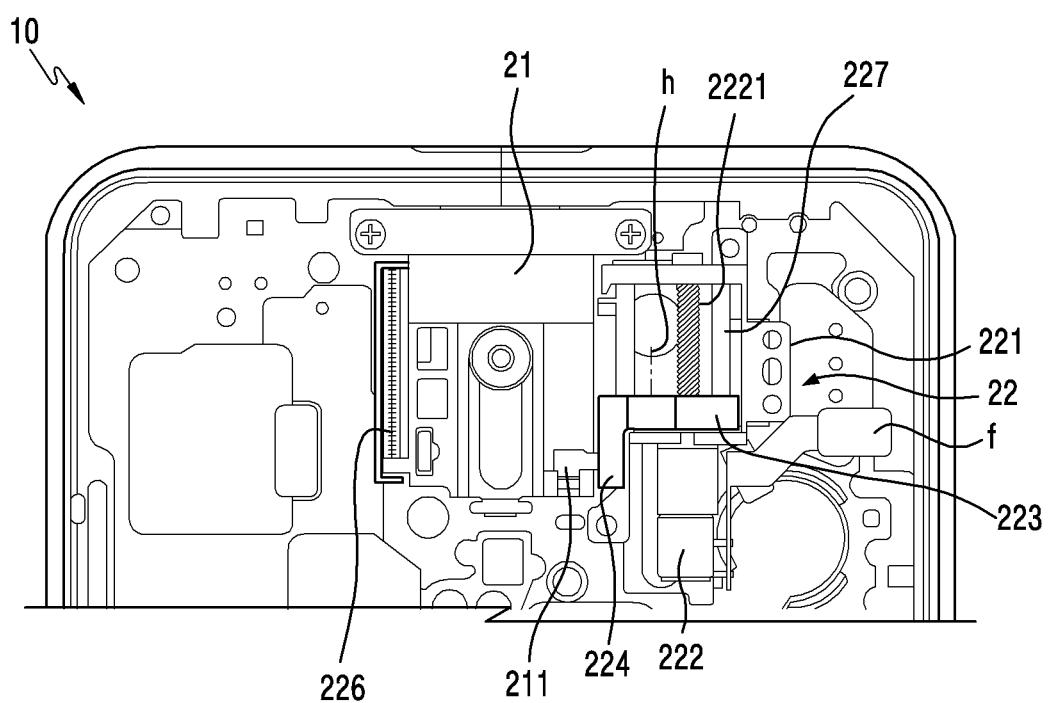
FIG. 4 is a plan view illustrating a mounting state of a pop-up module driver according to certain embodiments of the disclosure.

FIG. 4 is a plan view illustrating a mounting state of a pop-up module driver according to certain embodiments of the disclosure.

Referring to FIG. 4, a pop-up module driver according to an embodiment may include a pop-up driving unit 22 which pops up or pops down the pop-up module 21 from the main body housing 100 by a first distance d1, and may include an unlocking unit which releases a locking state of the pop-up module 21 by additionally popping up the pop-up module 21 by a second distance d2 and which pops down the pop-up module 21 to the inside of the main body housing 100 according to the releasing of the locking. "Pop up" may be utilized to indicate extension, and "pop down" may be utilized to indicate retraction.

According to an embodiment, the pop-up driving unit 22 may include a driving motor 222, a moving member 223, a locking arm 224, and a support structure 221. According to an embodiment, the driving motor 222 may be fixed by the support structure 221, and may provide pop-up/down force. The driving motor 222 may rotate in a forward or reverse direction, and may provide force for mechanically actuating the pop-up or pop-down operation. According to an embodiment, the driving motor 222 may include a rotation shaft 2221, and the rotation shaft 2221 may be disposed in a third direction (e.g., the third direction ③ of FIG. 1). According to an embodiment, the rotation shaft 2221 may have a first screw disposed on an outer circumferential surface. According to an embodiment, the driving motor 222 may be electrically coupled to a circuit board (e.g., the circuit board 15 of FIG. 1) by means of an electrical coupling member, for example, a Flexible Printed Circuit Board (FPCB) f.

According to an embodiment, the moving member 223 may be coupled to the rotation shaft 2221 of the driving motor 222, and may move up and down along a longitudinal direction (e.g., the third direction ③) of the rotation shaft 2221 according to the driving of the driving motor 222. According to an embodiment, since a second screw engaged with the first screw is disposed on an inner face of a through-hole, the moving member 223 may move linearly along the rotation shaft 2221 due to a forward or reverse rotation motion of the rotation shaft 2221. According to an embodiment, a linear motion of the moving member 223 may be guided in a stable and balanced manner by means of a guide rod 227. According to an embodiment, the guide rod 227 may be disposed at the support structure 221, and may be disposed in parallel at a place spaced apart from the rotation shaft 2221. According to an embodiment, the moving member 223 may have a limited range of movement within the support structure 221.

According to an embodiment, the locking arm 224 may be coupled to the moving member 223 to be rotatable about a hinge axis h, as a coupling member for physically coupling the pop-up module 21 and the moving member 223. When the moving member 223 moves in a pop-up direction, the pop-up module 21 is popped up by means of the locking arm 224. When the moving member 223 moves in a pop-down direction, the pop-up module 21 may be popped down. According to an embodiment, the hinge axis h may be a rotational center axis of the locking arm 224, and be parallel with each of the rotation shaft 2221 and the guide rod 227. According to an embodiment, the hinge axis h may also be parallel with the pop-up direction or pop-down direction of the pop-up module 21.

According to an embodiment, the locking arm 224 may be physically coupled to the pop-up module 21 by means of a locking pin 211.

According to an embodiment, an elastic body 226 may be disposed between the support structure 221 and the main body housing 100. For example, the elastic body 226 may be a compressed coil spring. According to an embodiment, the elastic body may be disposed in a pop-up direction of the pop-up module, and when the locking state of the pop-up module 21 is released, the pop-up module 21 may provide force so as to be popped down to the inside of the main body housing 100. According to an embodiment, one end of the elastic body 226 may be supported by the support structure 221, and the other end thereof may be supported by some structures of the main body housing 100. For example, the elastic body 226 may be in a compressed state when the pop-up module is popped up, and may be in an elongated state when the pop-up module is popped down. According to an embodiment, the elastic body 226 may be disposed within an accommodation groove formed at the main body housing 100, to maintain a compressed or elongated state according to a moving state of the pop-up module 21.

Figure 5:
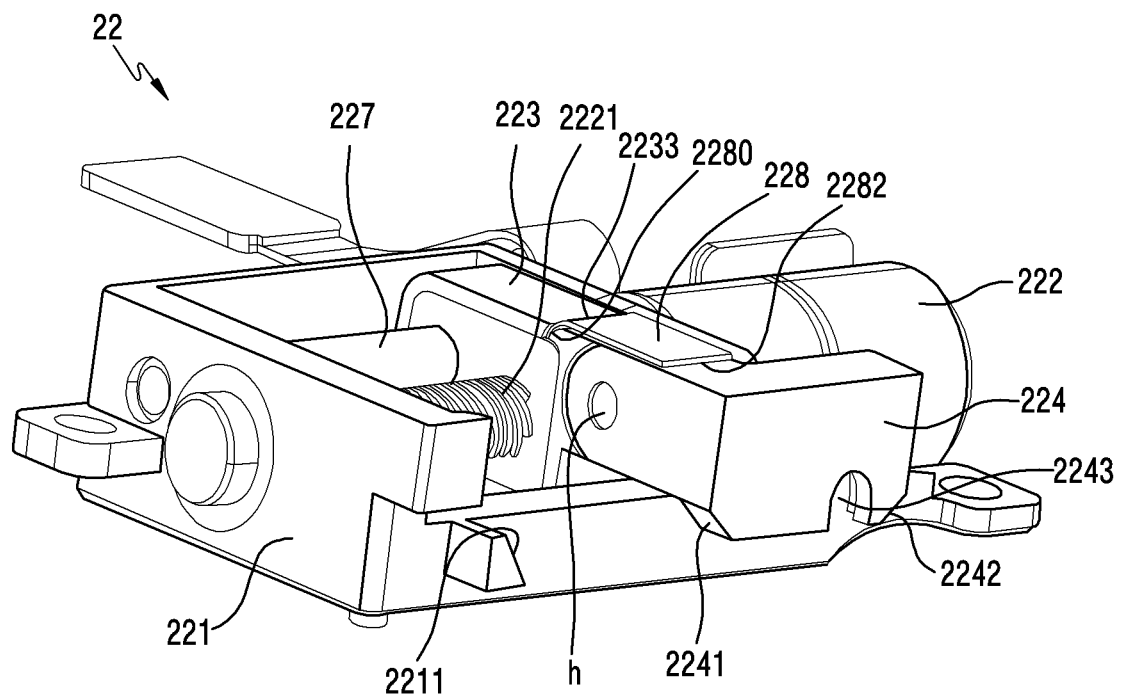
FIG. 5 is a perspective view illustrating a driving unit of a pop-up module driver according to certain embodiments of the disclosure.

FIG. 5 is a perspective view illustrating a driving unit of a pop-up module driver according to certain embodiments of the disclosure.

Referring to FIG. 5, a moving member 223 according to an embodiment may be accommodated inside a support structure 221, so that a linear reciprocating movement is possible along a rotation shaft 2221 due to an operation of a driving motor 222. According to an embodiment, the driving motor 222 may be disposed outside the support structure 221 and thus may be supported by the support structure 221. According to an embodiment, the rotation shaft 2221 of the driving motor may be located inside the support structure 221, and may be engaged with part of the moving member 223. By using an engagement structure between the rotation shaft 2221 and the moving member 223, the moving member 223 may move according to the rotation of the rotation shaft 2221. According to an embodiment, the rotation shaft 2221 may have a first screw disposed on an outer circumferential surface, and the moving member 223 may move along the rotation shaft 2221 to linearly move within a limited distance.

According to an embodiment, a locking arm 224 may be disposed to be rotatable about a hinge axis h so that a limited rotation is possible at one side of the moving member 223 by means of an elastic body 228. For example, the elastic body 228 may be a leaf spring.

According to an embodiment, the locking arm 224 may include a fixing groove 2233 for fixing one end of the elastic body 228. According to an embodiment, the hinge axis h may be in parallel with a direction in which the rotation shaft 2221 is disposed.

According to an embodiment, one end 2280 of the elastic body 228 may be fixed to the fixing groove 2233 and the other end 2282 may be coupled to the locking arm 224 as a free end, thereby providing force for restoring the locking arm 224 to a horizontal position.

According to an embodiment, the locking arm 224 may include a locking opening 2243. According to an embodiment, the locking opening 2243 may maintain a locking state by inserting a locking pin 211, or the locking pin 211 may be separated to release the locking state.

According to an embodiment, in order to release the locking, the locking arm 224 may include a first inclined face 2241 oriented in a pop-up direction of a support structure. According to an embodiment, the first inclined face 2241 may be disposed at a place spaced apart from the locking opening 2243, may be implemented for a sliding motion against part of the support structure 221, and may be implemented for a rotation motion of the locking arm 224 depending on a sliding motion against the support structure 221. According to an embodiment, the locking arm 224 may include a second inclined face 2242 oriented in a pop-down direction so as to be locked with the locking pin 211. According to an embodiment, the first and second inclined faces 2241 and 2242 may face each other.

According to an embodiment, the support structure 221 may have a third inclined face 2211 implemented for sliding against the first inclined face 2241 depending on the movement of the locking arm 224. According to an embodiment, as an inclined face for releasing the locking, the third inclined face 2211 may be an inclined face which slides against the first inclined face 2241 of the locking arm 224 upon detecting a falling state of an electronic device 10.

According to an embodiment, when the moving member 223 is actuated upon detecting the falling state of the electronic device, the first inclined face 2241 may be in contact with the third inclined face 2211 and then moves by sliding against the third inclined face 2211, causing rotation. The locking arm 224 having the first inclined face 2241 may thus rotate about the rotation axis h.

Figure 6:
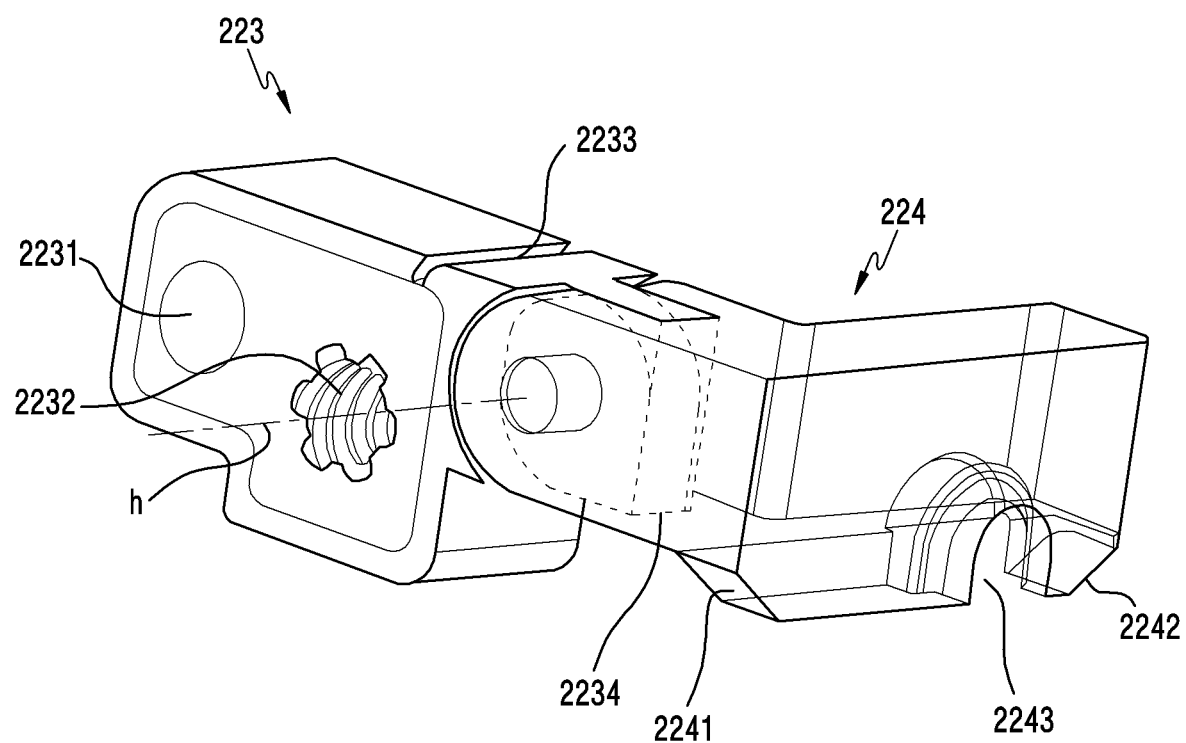
FIG. 6 is a perspective view illustrating a case where a locking arm coupled to a moving member of a driving unit maintains a horizontal state by means of an elastic body according to certain embodiments of the disclosure.

FIG. 6 is a perspective view illustrating a case where a locking arm coupled to a moving member of a driving unit maintains a horizontal state by means of an elastic body according to certain embodiments of the disclosure.

Referring to FIG. 6, a moving member 223 according to an embodiment may include a guide hole 2231 to which a guide rod 227 is inserted and a through-hole 2232 to which a rotation shaft 2221 is inserted. According to an embodiment, the through-hole 2232 may have a second screw disposed on an inner face thereof.

According to an embodiment, a rotation-limiting structure for a limited rotation of a locking arm 224 may be included. According to an embodiment, the structure may include a rotation preventing planar portion 2234 disposed at one portion of the moving member 223. The locking arm 224 may rotate limitedly by means of the rotation preventing planar portion 2234. For example, the locking arm 224 is rotatable counterclockwise due to a sliding motion between first and third inclined faces 2241 and 2211, but a clockwise rotation may be limited by means of the rotation preventing planar portion 2234. The locking arm 224 of FIG. 6 may be in contact with a planar portion, and thus may be restricted from surpassing a horizontal position state, in which rotation is no longer possible. According to an embodiment, since the locking arm 224 rotates due to the sliding motion between the first and third inclined faces 2241 and 2211, a locking pin 211 which is locked may be separated from a locking opening 2243.

Figure 7:
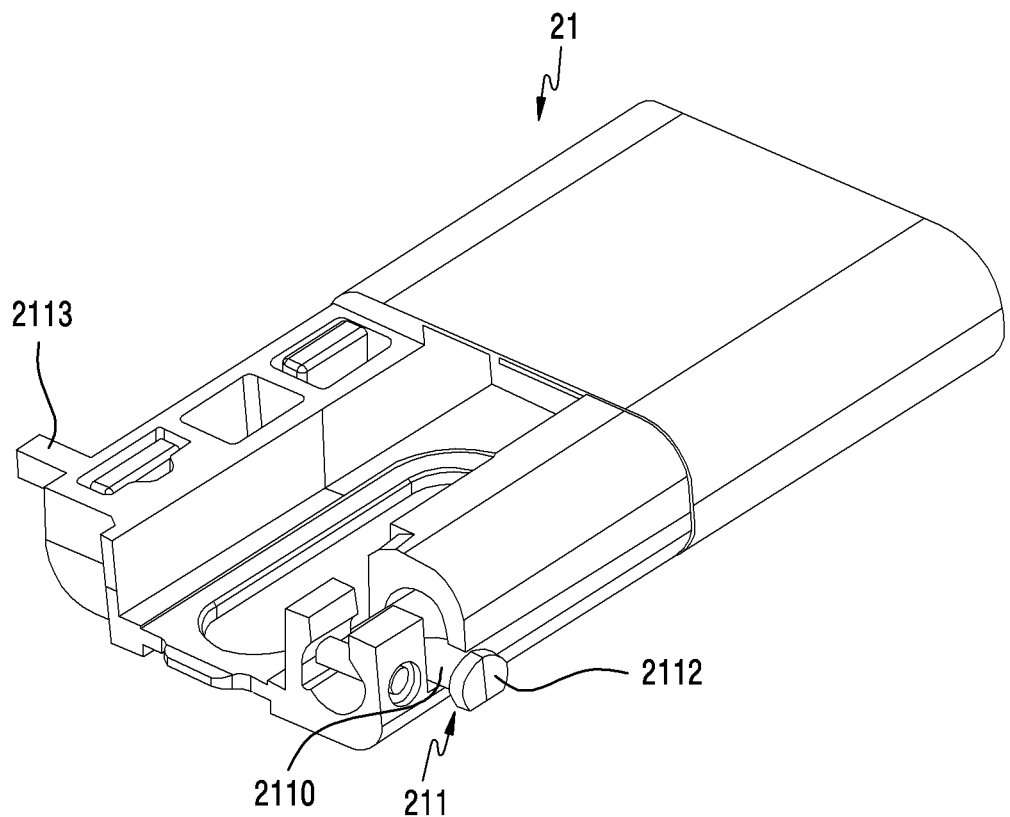
FIG. 7 is a perspective view illustrating a pop-up module according to certain embodiments of the disclosure.

FIG. 7 is a perspective view illustrating a pop-up module according to certain embodiments of the disclosure.

Referring to FIG. 7, according to an embodiment, for example, a pop-up module 21 may include a camera module mounted thereon. A rib 2113 for an elastic body may be disposed to one side of the pop-up module 21, and a locking pin 211 may be disposed to the other side thereof. According to an embodiment, in the pop-up module 21, the rib 2113 for the elastic body may be disposed to protrude in a direction perpendicular to a pop-up direction, and the locking pin 211 may be disposed to protrude in a direction perpendicular to the pop-up direction.

According to an embodiment, the locking pin 211 may include a body 2110 and a protrusion 2112 disposed at one end of the body 2110. For example, the body 2110 may be formed in a cylindrical shape. When one end of the locking pin 211 is coupled to a locking opening (e.g., the locking opening 2243 of FIG. 5) of a locking arm 224, it may be stably restrained.

Figure 8:
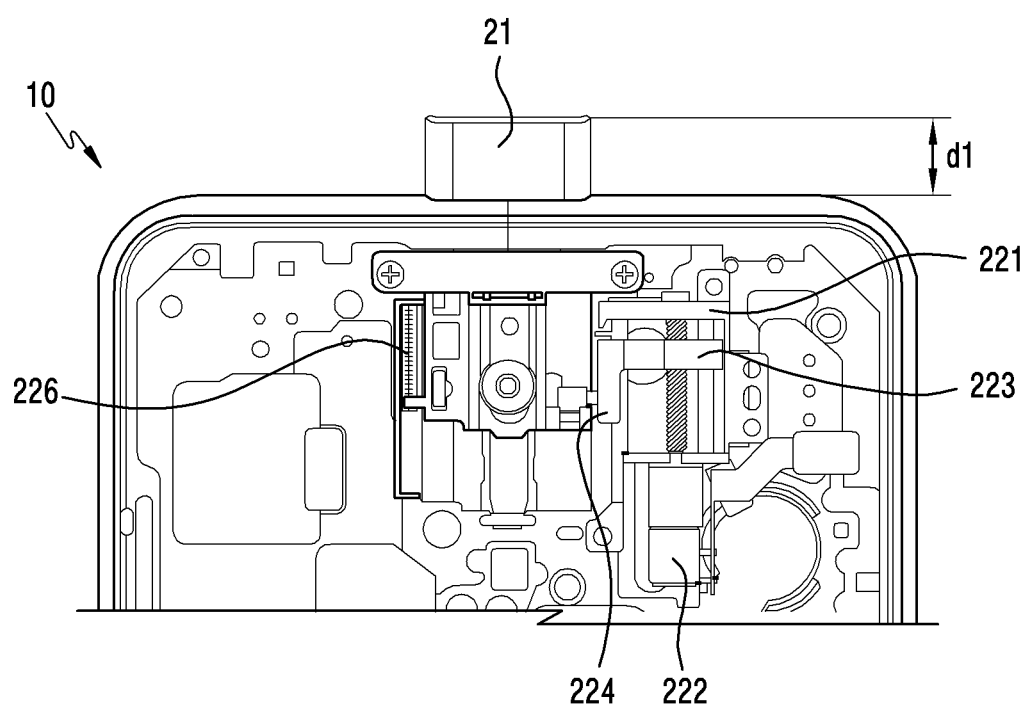
FIG. 8 is a plan view illustrating a pop-up module in a pop-up state according to certain embodiments of the disclosure.
Figure 9:
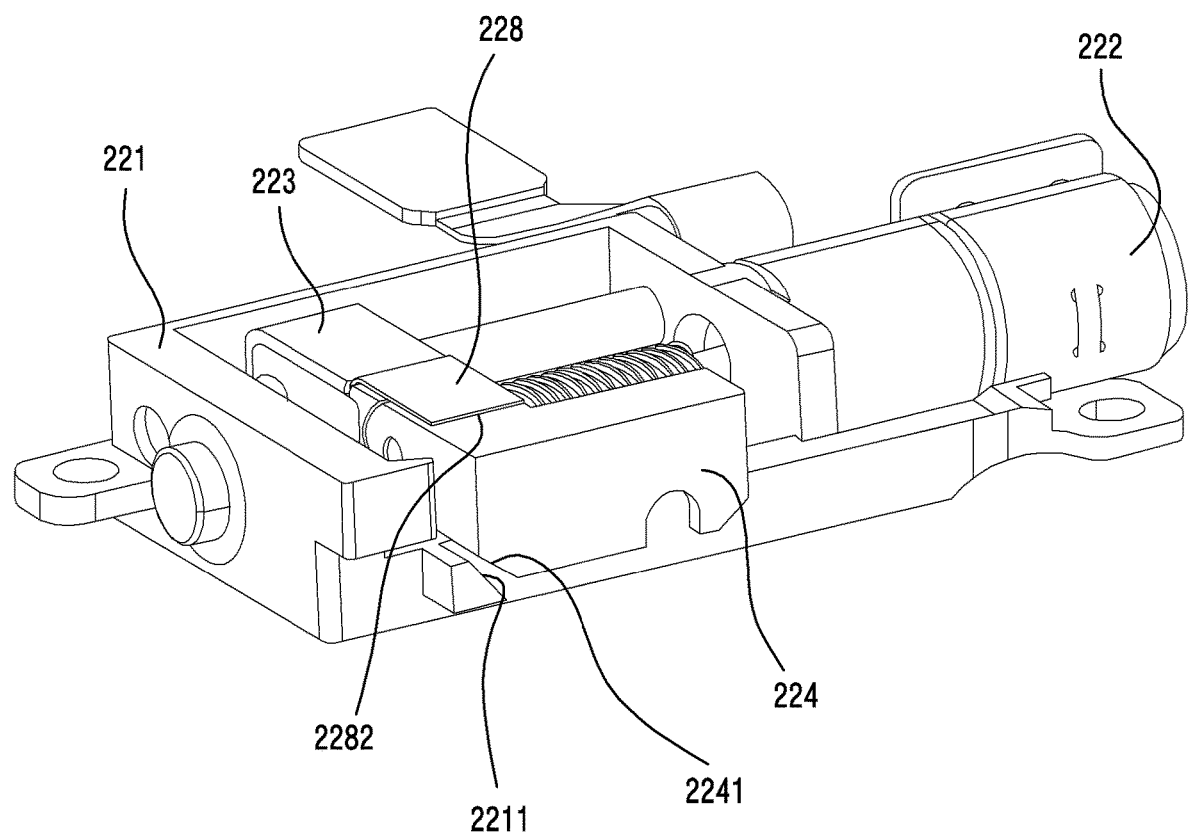
FIG. 9 is a perspective view illustrating a driving unit when a pop-up module in a pop-up state is popped up by a first distance according to certain embodiments of the disclosure.

FIG. 8 is a plan view illustrating a pop-up module in a pop-up state according to certain embodiments of the disclosure. FIG. 9 is a perspective view illustrating a driving unit when a pop-up module in a pop-up state is popped up by a first distance according to certain embodiments of the disclosure.

Referring to FIG. 8 and FIG. 9, according to an embodiment, a pop-up module 21 may be popped up from a main body housing 100 by a first distance d1 when a driving motor 222 rotates responsive to a signal transmitted from a control unit. According to an embodiment, when the driving motor 222 rotates in a forward rotation direction, a moving member 223 may move within a support structure 221 by the first distance d1, and at the same time, the pop-up module 21 may be popped up by the same first distance d1 from the main body housing 100. Simultaneously, an elastic body 226 may be compressed by the motion, settling into a compressed state. According to an embodiment, in a pop-up state of the pop-up module 21, the moving member 223 may be spaced apart from one end of the support structure 221. First and third inclined faces 2241 and 2211 may be spaced apart from each other, and may be close to each other and facing each other.

According to an embodiment, a locking arm 224 may be set in a horizontal state in the support structure 221 by means of an elastic body 228. One end 2282 of the elastic body 228 presses the locking arm 224, and due to a rotation-limiting structure such as a rotation preventing planar portion 2234, the locking arm 224 may be maintained a horizontal state in the support structure 221.

Figure 10:
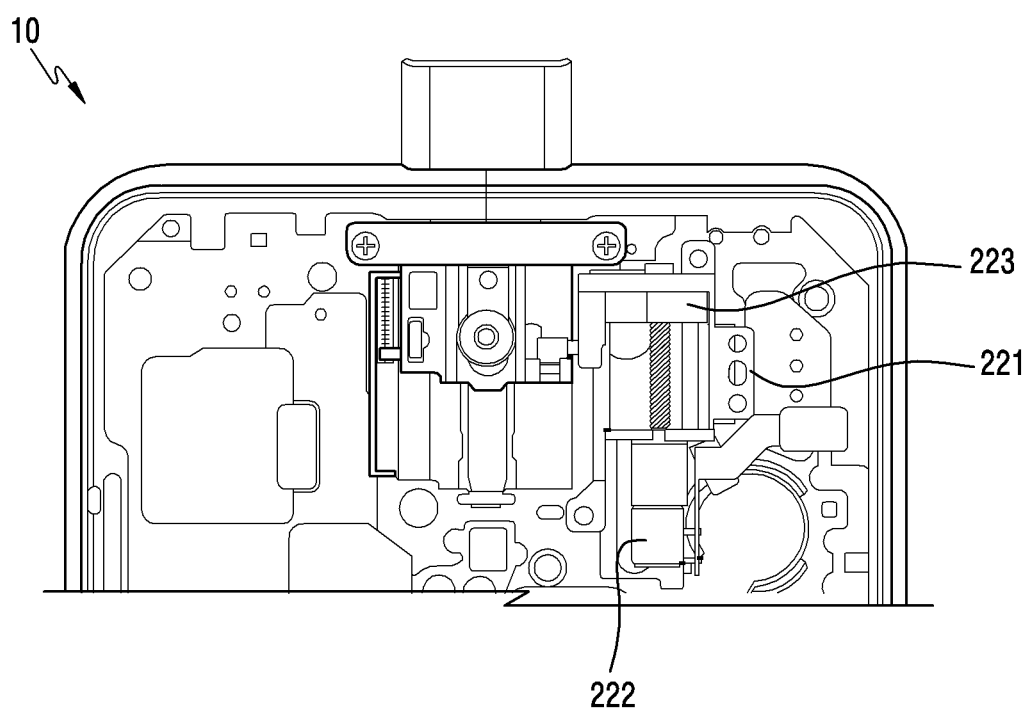
FIG. 10 is a plan view illustrating a state where a pop-up module in a pop-up state is additionally popped up by a second distance when falling of an electronic device is detected according to certain embodiments of the disclosure.
Figure 11A:
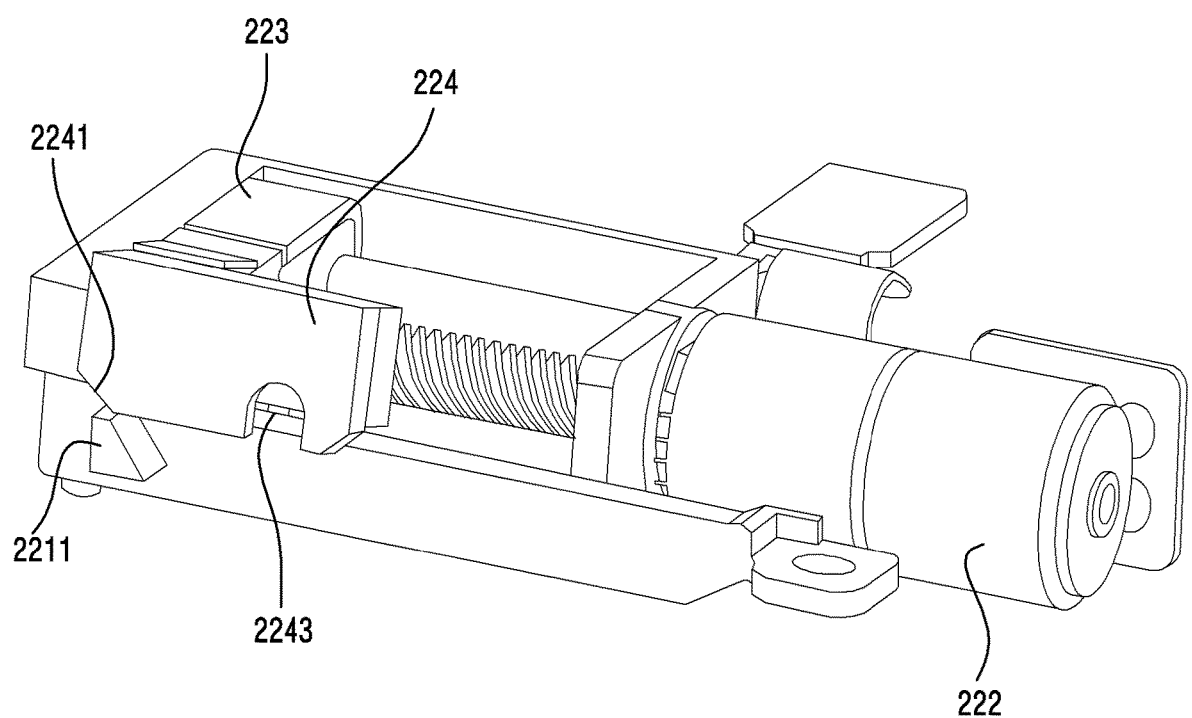
FIG. 11A is a perspective view illustrating a state where a driving unit is unlocked when an additional pop-up occurs according to certain embodiments of the disclosure.
Figure 11B:
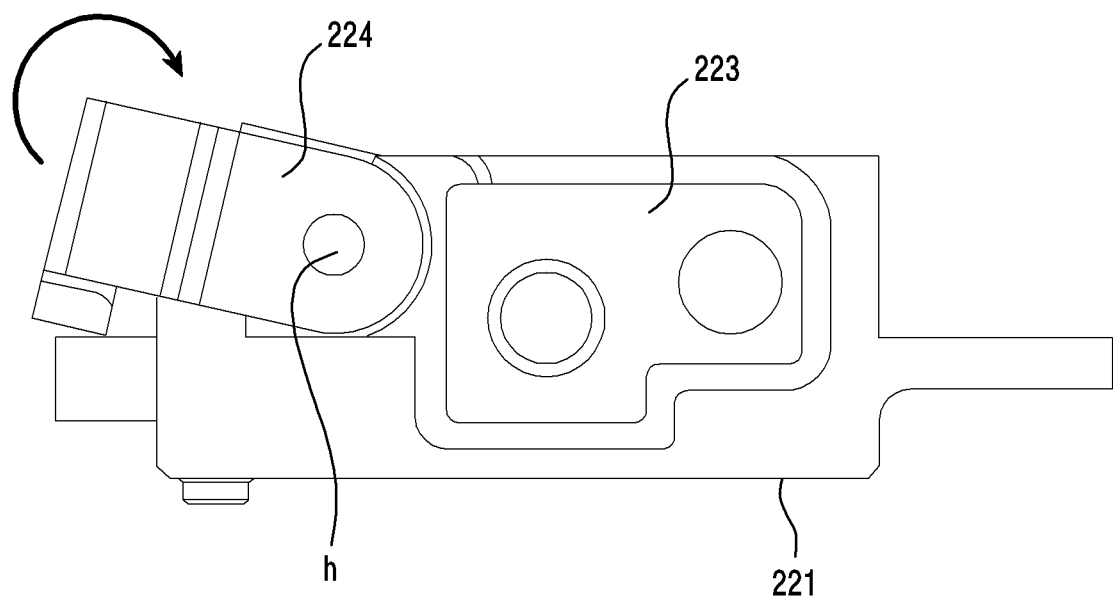
FIG. 11B is a front view of FIG. 11A.

FIG. 10 is a plan view illustrating a state where a pop-up module in a pop-up state is additionally popped up by a second distance when falling is detected according to certain embodiments of the disclosure. FIG. 11A is a perspective view illustrating a state where a driving unit is unlocked when an additional pop-up occurs according to certain embodiments of the disclosure. FIG. 11B is a front view of FIG. 11A.

Referring to FIG. 10 to FIG. 11B, according to an embodiment, when an electronic device 10 detects a falling state using an acceleration sensor, driving units 22 and 222 may further rotate in a forward direction under the control of a control unit 1600, and at the same time, a moving member 223 may be additionally popped up by a second distance d2. According to an embodiment, the moving member 223 may be additionally popped up to be disposed in contact with part of a support structure 221.

According to an embodiment, when the moving member 223 is additionally popped up by the second distance d2, a first inclined face 2241 of a locking arm 224 may perform a sliding motion against a third inclined face 2211, and subsequently, the first inclined face 2241 may rotate by moving up along the third inclined face 2211. Since moving force of the moving member 223 is greater than elastic force of an elastic body, the locking arm 224 may rotate within a specific angle due to a sliding motion between the first and third inclined faces 2241 and 2211.

According to an embodiment, simultaneously, while the locking arm 224 rotates, a locking opening (e.g., the locking opening 2243 of FIG. 5) of the locking arm 224 may be separated from a locking pin 211.

Figure 12:
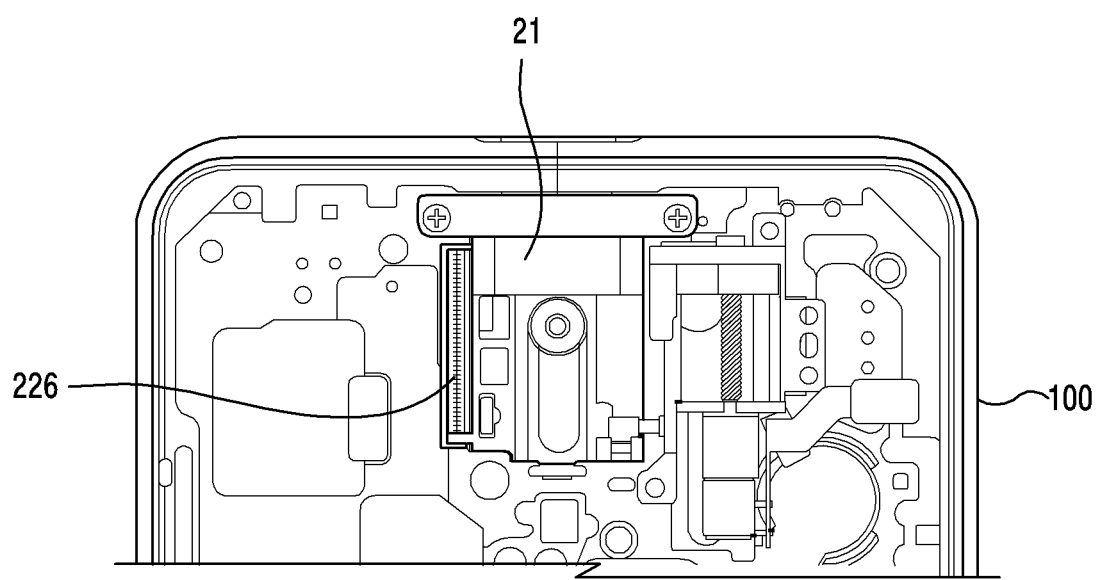
FIG. 12 is a plan view illustrating a moment at which a pop-up module is unlocked to be popped down by means of an elastic body in an additional pop-up state according to certain embodiments of the disclosure.

FIG. 12 is a plan view illustrating a moment at which a pop-up module is unlocked to be popped down by means of an elastic body in an additional pop-up state according to certain embodiments of the disclosure.

Referring to FIG. 12, according to an embodiment, when a locking opening (e.g., the locking opening 2243 of FIG. 5) of a locking arm 224 is unrestrained from a locking pin 211, a compressed elastic body 226 is elongated to provide force by which a pop-up module 21 is popped down to the inside of a main body housing 100. In FIG. 12, the elastic body 226 is in an elongated state, and the pop-up module 21 may be popped down while the elastic body 226 is elongated.

Figure 13:
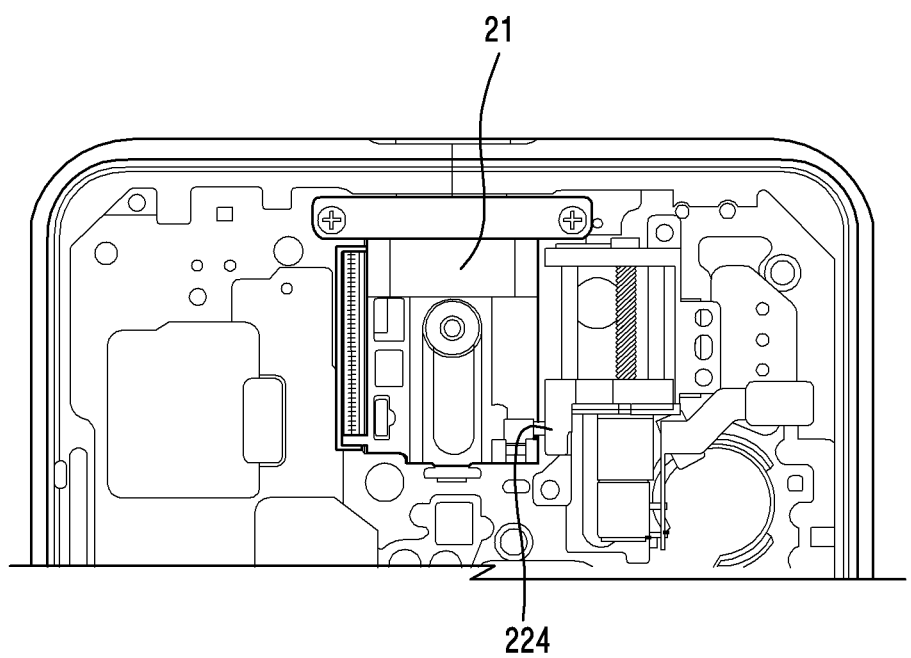
FIG. 13 is a plan view illustrating a pop-up module driver in a pop-down state of a pop-up module according to certain embodiments of the disclosure.
Figure 14A:
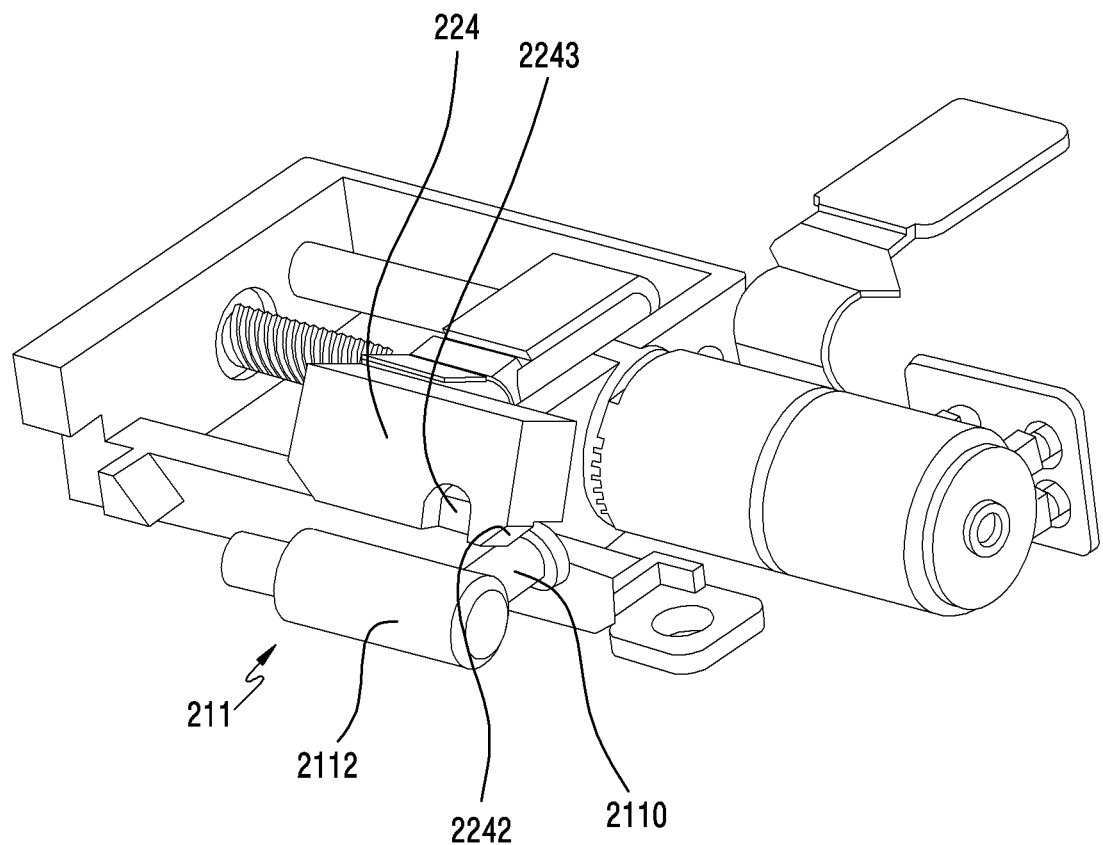
FIG. 14A is a perspective view illustrating a state where a locking member rotates after a second inclined face of a locking arm slides against a locking pin when a pop-down occurs according to certain embodiments of the disclosure.
Figure 14B:
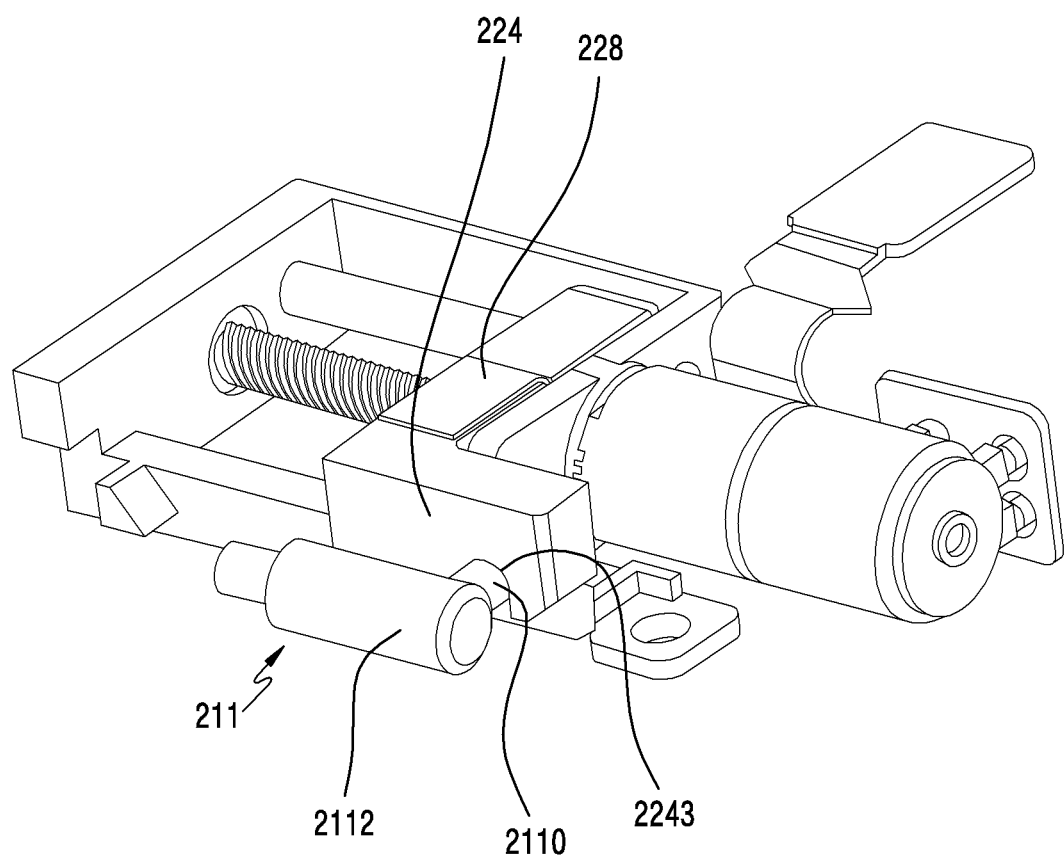
FIG. 14B is a perspective view illustrating a state where a pop-up module is popped down and thus a locking member is restrained to a locking pin according to certain embodiments of the disclosure.

FIG. 13 is a plan view illustrating a pop-up module driver in a pop-down state of a pop-up module according to certain embodiments of the disclosure. FIG. 14A is a perspective view illustrating a state where a locking member rotates after a second inclined face of a locking arm slides against a locking pin when a pop-down occurs according to certain embodiments of the disclosure. FIG. 14B is a perspective view illustrating a state where a pop-up module is popped down and thus a locking member is restrained to a locking pin according to certain embodiments of the disclosure.

Referring to FIG. 13 to FIG. 14B, in a pop-up module 21 which is popped down, according to a second inclined face 2242 of a locking arm 224 sliding against a body 2110 of a locking pin 211, upon which the locking pin 211 inserts into a locking opening (e.g., the locking opening 2243 of FIG. 5) after the locking arm 224 of the second inclined face 2242 rotates. Rotational force for the locking pin 211 to move into a horizontal position state, may be provided by an elastic body 228.

Figure 15:
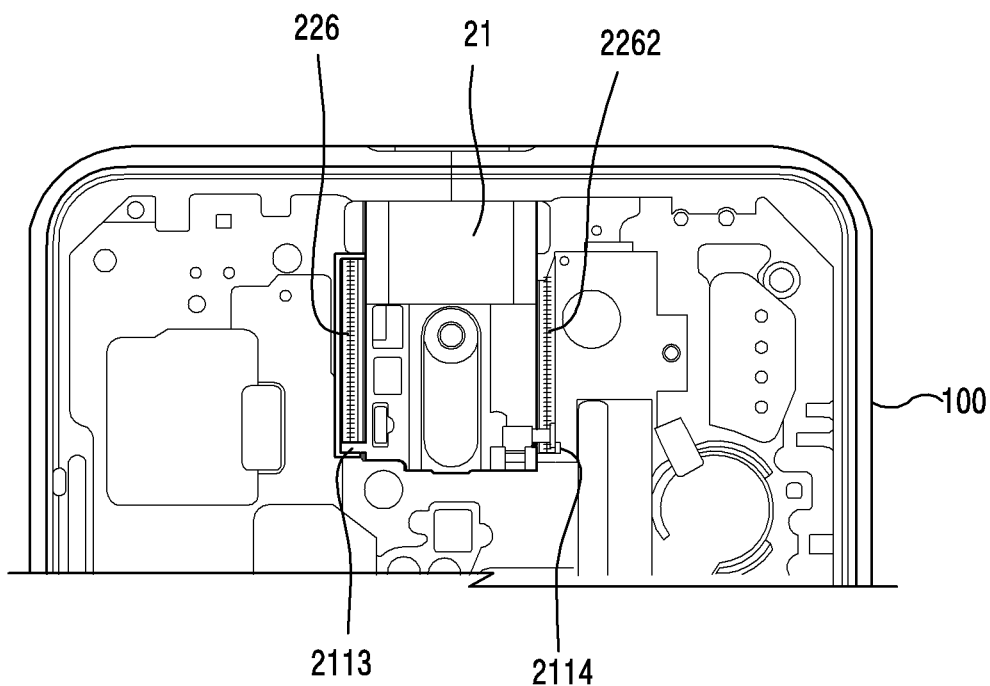
FIG. 15 is a plan view illustrating a mounting state of a pop-up module driver according to various other embodiments of the disclosure.

FIG. 15 is a plan view illustrating a mounting state of a pop-up module driver according to various other embodiments of the disclosure.

Referring to FIG. 15, elastic bodies 226 and 2262 which provide pop-down force of the pop-up module 21 according to an embodiment may be disposed in pair between a main body housing 100 and a pop-up module 21. When the pop-up module 21 is popped down, the elastic bodies 226 and 2262 may be disposed respectively at both sides of the pop-up module 21 to balance the pop-down force. For example, ribs 2113 and 2114 for supporting the elastic bodies 226 and 2262 may be disposed respectively at the both sides of the pop-up module 21.

Figure 16:
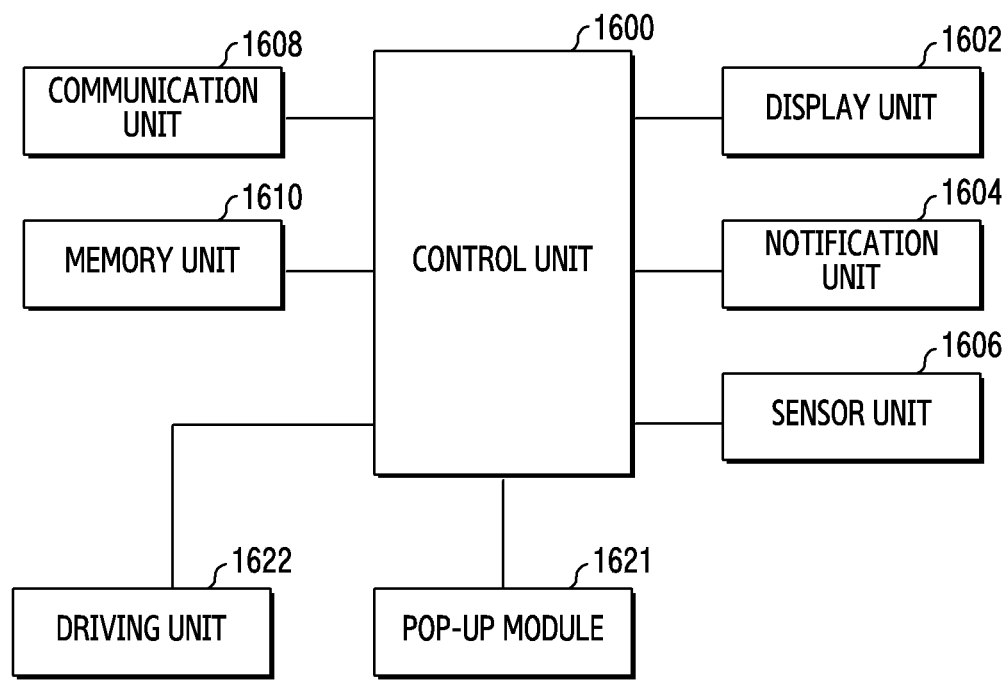
FIG. 16 is a block diagram illustrating an internal structure of an electronic device according to certain embodiments of the disclosure.

FIG. 16 is a block diagram illustrating an internal structure of an electronic device according to certain embodiments of the disclosure.

Referring to FIG. 16, the electronic device may be the electronic device 10 of FIG. 1. In addition, as illustrated, the electronic device may include a control unit 1600 (e.g., a processor), a display unit 1602, a notification unit 1604, a sensor unit 1606, a communication unit 1608, a memory unit 1610, a driving unit 1622, and a pop-up module 1621. However, this is for example purposes only, and an embodiment of the disclosure is not limited thereto. For example, at least one of the aforementioned components may be omitted, or the electronic device may further include additional components other than the aforementioned components.

According to certain embodiments, the display unit 1602 may visually provide information to the outside (e.g., a user) of the electronic device. The display unit 1602 may include, for example, a display, a hologram device, or a projector and control circuitry to control a corresponding one of the display, hologram device, and projector.

According to an embodiment, the display unit 1602 may include touch circuitry adapted to detect a touch, or sensor circuitry (e.g., a pressure sensor) adapted to measure the intensity of force incurred by the touch. For example, the display unit 1602 may correspond to a display module included in the first plate 11 of FIG. 1.

According to certain embodiments, the notification unit 1604 may provide a specific state, for example, a booting state, a message state, a charging state, or the like, of the electronic device or part thereof.

According to certain embodiments, the sensor unit 1606 may detect an operational state (e.g., power or temperature) of the electronic device or an environmental state (e.g., a state of a user) external to the electronic device, and then generate an electrical signal or data value corresponding to the detected state. According to an embodiment, the sensor unit 1606 may include, for example, a biometric sensor, a temperature sensor, a humidity sensor, or an illuminance sensor. In addition, the sensor unit 1606 may include at least one sensor, for example, an acceleration sensor, for detecting a falling state of the electronic device.

According to certain embodiments, the communication unit 1608 may support establishing a direct (e.g., wired) communication channel or a wireless communication channel between the electronic device and the external electronic device and performing communication via the established communication channel. The communication unit 1608 may include a wireless communication module (e.g., a cellular communication module, a short-range wireless communication module, or a Global Navigation Satellite System (GNSS) communication module) or a wired communication module (e.g., a Local Area Network (LAN) communication module or a Power Line Communication (PLC) module).

According to certain embodiments, the memory unit 1610 may store various data used by at least one component (e.g., the control unit 1600 or the sensor unit 1606) of the electronic device. The data may include, for example, software and input data or output data for a command related thereto.

According to certain embodiments, the pop-up module 1621 may be configured to be popped up from the housing of the electronic device to the outside or to be popped down to the inside of the housing, and may include at least some modules of the electronic device. For example, the at least some modules may include a camera module, an audio device, or the like.

According to certain embodiments, the driving unit 1622 may provide force by which the pop-up module 1621 is popped up or popped down. For example, the driving unit 1622 may include the driving motor 222 of FIG. 4.

According to certain embodiments, the control unit 1600 may execute, for example, software (e.g., a program) stored in the memory 1610 to control at least one other component (e.g., a hardware or software component) of the electronic device coupled with the control unit 1600, and may perform various data processing or computation.

According to an embodiment, the control unit 1600 may control the operation of the pop-up module 1621, based on a user input. The user input may be associated with a command instructing a pop-up of the pop-up module 1621 and/or a command instructing a pop-down of the pop-up module 1621. In addition, the user input may include at least one of a touch input, a gesture input, a voice input, and a button input. For example, in response to detecting the input instructing the pop-up of the pop-up module 1621, the control unit 1600 may control the driving unit 1622 so that the pop-up module 1621 is popped up from the housing of the electronic device by a specific distance and at a specific speed. In addition, in response to detecting the input instructing the pop-down of the pop-up module 1621, the control unit 1600 may control the driving unit 1622 so that the pop-up module 1621 is popped down to the inside of a main body housing.

According to an embodiment, the control unit 1600 may detect a falling state of the electronic device, based on data acquired from the sensor unit 1606. For example, the control unit 1600 may detect the falling state of the electronic device by using data acquired from an acceleration sensor. For example, the control unit 1600 may detect the falling state of the electronic device in a state where the pop-up module 1621 is popped up.

According to an embodiment, in response to detecting the falling state of the electronic device, the control unit 1600 may provide control such that the pop-up module 1621 in a pop-up state switches to a pop-down state. For example, the control unit 1600 may control the driving unit 1622 such that the pop-up module 1621 is popped down to the inside of the main body housing.

According to an embodiment, in response to detecting the falling state of the electronic device, the control unit 1600 may control the notification unit 1604 to output a notification indicating the falling of the electronic device. For example, the control unit 1600 may provide control such that a notification is output in an audio form, a vibration form, or the like.

Figure 17:
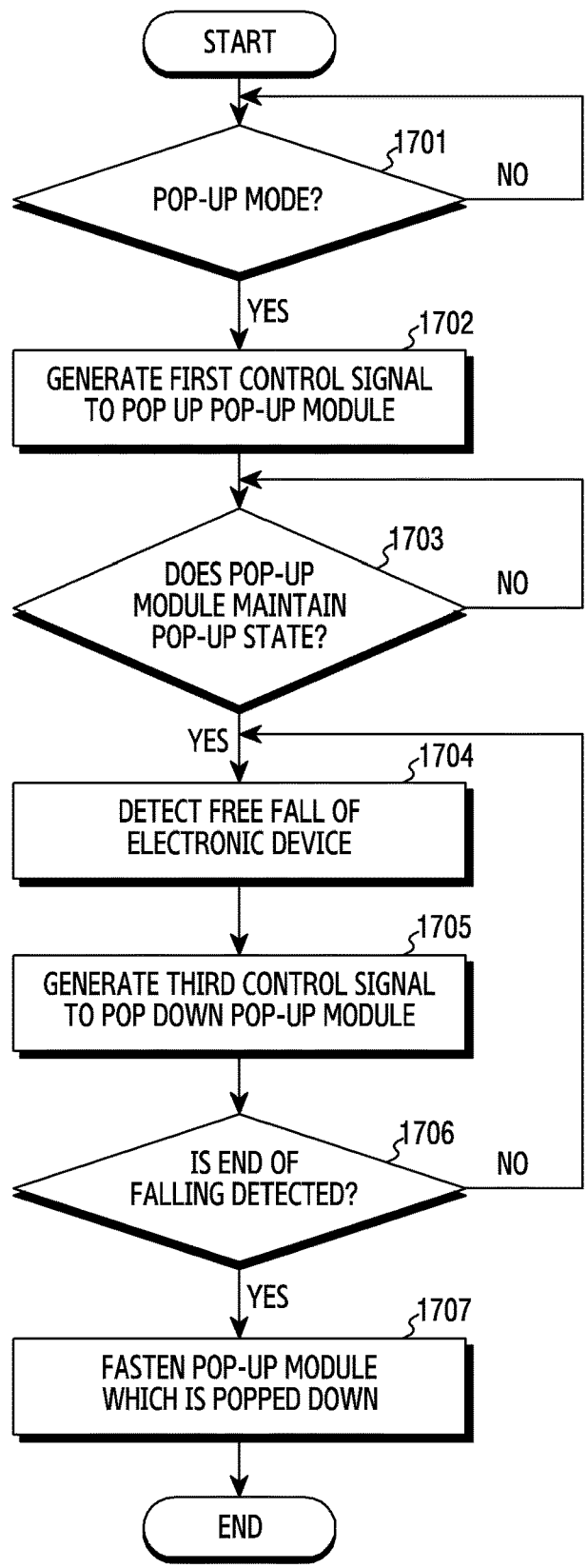
FIG. 17 is a flowchart for controlling a pop-up module depending on falling of an electronic device according to certain embodiments of the disclosure.

FIG. 17 is a flowchart for controlling a pop-up module depending on falling of an electronic device according to certain embodiments of the disclosure. In the following embodiment, each of operations may be performed sequentially, but is not necessarily performed sequentially. For example, an order of each of operations may be changed, and at least two operations may be performed in parallel.

Referring to FIG. 17, according to certain embodiments, in operation 1701, an electronic device (e.g., the control unit 1600 of FIG. 16) may determine whether an input requesting the pop-mode is detected. The pop-up mode may be a state where the pop-up module 21 is popped up from a housing of the electronic device to the outside.

According to certain embodiments, if the input for instructing to execute the pop-up mode is not detected, the electronic device (e.g., the control unit 1600 of FIG. 16) may repeat an operation of determining whether to execute the pop-up mode.

According to certain embodiments, if the input for requesting the pop-up mode is detected, in operation 1702, the electronic device (e.g., the control unit 1600 of FIG. 16) may generate a first control signal to actuate extension of the pop-up module 21. The first control signal may be a signal for instructing to pop up the pop-up module 21 from the housing of the electronic device by a specific distance and at a specific speed, and the control unit 1600 may provide the first control signal to the driving unit 1622.

According to certain embodiments, in operation 1703, the electronic device (e.g., the control unit 1600 of FIG. 16) may determine whether the pop-up state is to be maintained. According to an embodiment, the control unit 1600 may determine whether to set a locking state for fixing the pop-up module 21 which is popped up.

According to certain embodiments, if the locking state of the pop-up module 21 is not identified, the electronic device (e.g., the control unit 1600 of FIG. 16) may wait until the pop-up module 21 is in the locking state.

According to certain embodiments, if the locking state of the pop-up module 21 is identified, in operation 1704, the electronic device (e.g., the control unit 1600 of FIG. 16) may detect a free fall of the electronic device. According to an embodiment, the control unit 1600 may detect the free fall of the electronic device by using an acceleration sensor as described below with reference to FIG. 18.

According to certain embodiments, if the free fall of the electronic device is detected, in operation 1705, the electronic device (e.g., the control unit 1600 of FIG. 16) may generate a third control signal to retract the pop-up module 21. The third control signal may be a signal instructing the electronic device to retract into the housing, and the control unit 1600 may provide the third control signal to the driving unit 1622.

According to certain embodiments, in operation 1706, the electronic device (e.g., the control unit 1600 of FIG. 16) may determine whether impact with a surface is detected, indicating that the electronic device is no longer falling.

According to certain embodiments, if the impact is not detected, the electronic device (e.g., the control unit 1600 of FIG. 16) may continue retracting the pop-up module 21.

According to certain embodiments, if the impact is detected, in operation 1707, the electronic device (e.g., the control unit 1600 of FIG. 16) may actuate locking of the pop-up module 21 to set the pop-up module 21 in a locked state while retracted.

Figure 18:
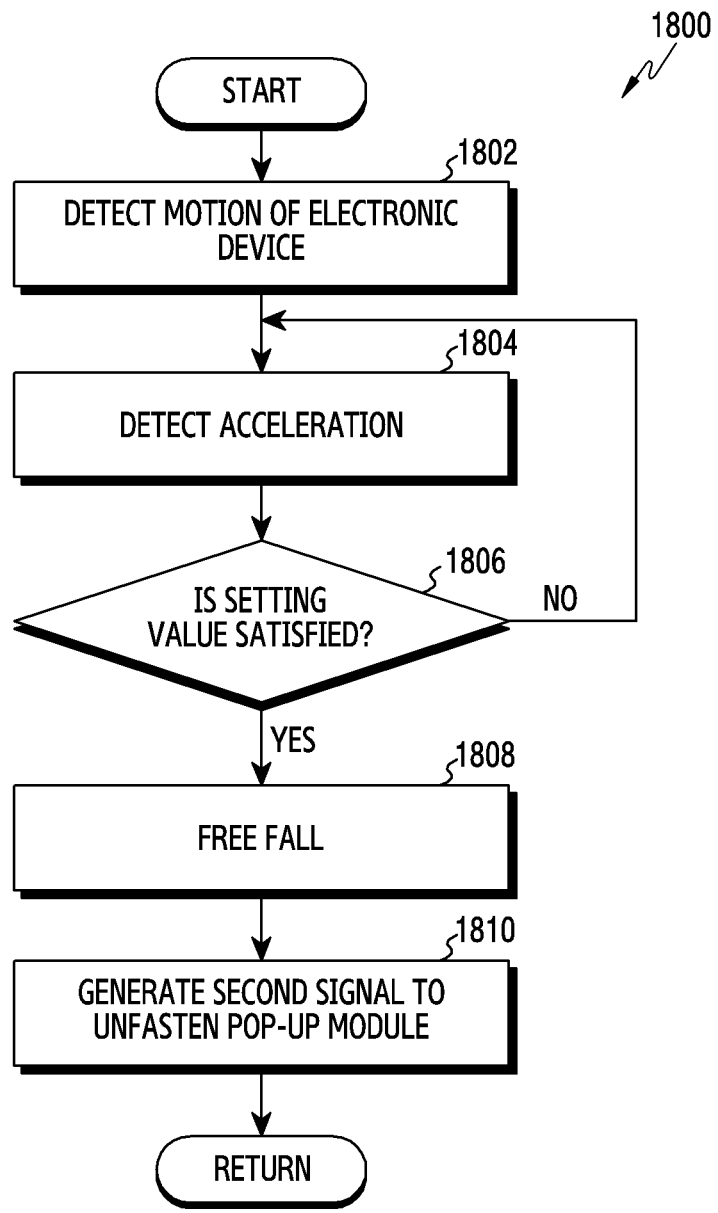
FIG. 18 is a flowchart for detecting a free fall in an electronic device according to certain embodiments of the disclosure.

FIG. 18 is a flowchart for detecting a free fall in an electronic device according to certain embodiments of the disclosure.

Operations of FIG. 18 described below may represent certain embodiments of the operation 1704 of FIG. 17. In the following embodiment, each of operations may be performed sequentially, but is not necessarily performed sequentially. For example, an order of each of operations may be changed, and at least two operations may be performed in parallel.

Referring to FIG. 18, according to certain embodiments, in operation 1802, an electronic device (e.g., the control unit 1600 of FIG. 16) may detect a motion of the electronic device.

According to certain embodiments, in operation 1804, the electronic device (e.g., the control unit 1600 of FIG. 16) may detect acceleration based on the motion of the electronic device. According to an embodiment, the control unit 1600 may detect the acceleration based at least in part on data acquired from an acceleration sensor.

According to certain embodiments, in operation 1806, upon detecting the falling, the electronic device (e.g., the control unit 1600 of FIG. 16) may detect this due to an increase in the acceleration, or may detect this even in a situation where the acceleration is 0 (in a situation of gravitational acceleration). Whether the acceleration is detected may also be detected when the acceleration abruptly changes (e.g., when the acceleration abruptly increases or decreases or is 0), that is, when it satisfies a pre-set value. A specified threshold may be a reference value for determining the free fall of the electronic device.

According to certain embodiments, upon detecting acceleration less than the pre-set value, the electronic device (e.g., the control unit 1600 of FIG. 16) may detect not the free fall but the motion of the electronic device.

According to certain embodiments, upon detecting acceleration greater than or equal to the pre-set value, in operation 1808, the electronic device (e.g., the control unit 1600 of FIG. 16) may detect a state where the electronic device falls due to a user's carelessness.

According to certain embodiments, upon detecting the state where the electronic device falls, in operation 1810, the electronic device (e.g., the control unit 1600 of FIG. 16) may generate a second signal to unfasten the pop-up module 21 which is popped up.

Referring to FIG. 17 and FIG. 18 described above, according to certain embodiments in which the pop-up module 21 is popped up/down for protection from the falling, when the control unit 1600 is in a pop-up mode (e.g., capturing, listening music) in operation 1701, a first control signal is generated to pop up the pop-up module 21 in operation 1702, and the driving unit 22 is controlled to pop up the pop-up module 21 as shown in FIG. 3B. That is, the pop-up module 21 protrudes to the outside by a first distance d1 (FIG. 8). The control unit 1600 may identify that the pop-up module 21 persistently maintains the pop-up state in operation 1703. In this case, the electronic device may fall due to the user's carelessness. When the electronic device falls in operation 1704 (FIG. 2A), it is controlled such that a pop-down (FIG. 2C) is allowed. That is, the control unit 1600 of the electronic device detects a motion using a motion detecting sensor of the sensor unit 1606 in operation 1802 of FIG. 18, and detects acceleration in operation 1804. When the acceleration is greater than or equal to a threshold in operation 1806, then the control unit 1600 determines a free fall condition in operation 1808. If it is the free fall, the control unit 1600 generates a second control signal to release the pop-up module 21 which is popped up. That is, the pop-up module 21 is additionally popped up by a second distance d2 as in the example of FIG. 3C to release a locking state of the pop-up module 21 as in the example of FIG. 10. Due to the releasing of the locking, the pop-up module 21 is unlocked to be popped down to the inside of the main body housing 100. Through the process of FIG. 11A and FIG. 11B, in operation 1705, the pop-up module 21 which is unfastened generates a third control signal so that the control unit 1600 pops down the pop-up module 21 to the driving unit 22. By using the pop-down control signal, the control unit 1600 pops down the pop-up module 21, which is unfastened from the pop-up, as in the example of FIG. 12. Therefore, the pop-up module 21 is popped down to the inside of the electronic device, and thus can be protected since it is before being impacted by the floor. In operation 1706, the control unit 1600 detects the end of the falling of the electronic device by means of the sensor unit 1606. When the falling of the electronic device ends, the control unit 1600 may control the driving unit 22 to reversely rotate a motor, thereby fastening the locking of the pop-up module 21 which is popped down as in the example of FIG. 13.

Certain embodiments of the disclosure disclosed in the specification and the drawing are merely a specific example presented for clarity and are not intended to limit the embodiments of the disclosure. Therefore, in addition to the embodiments disclosed herein, various changes in forms and details made without departing from the technical concept of the certain embodiments of the disclosure will be construed as being included in the embodiments of the disclosure.

The invention claimed is:

1. An electronic device, comprising:
   a main body housing; and
   a pop-up module that is extendable and retractable from the main body housing; and
   a pop-up driving unit coupled to the main body housing, the pop-up driving unit interoperating with the pop-up module to provide mechanical force to extend and retract the pop-up module by a first distance from the main body housing,
   an unlocking unit actuatable to release a locking state of the pop-up module by additionally extending the pop-up module past the first distance when the electronic device is falling; and
   a first elastic body disposed between the main body housing and the pop-up module, the first elastic body providing a force by which the pop-up module is retracted into the main body housing after the locking state is released by the unlocking unit.

2. The electronic device of claim 1, wherein the pop-up driving unit further comprises:
   a support structure coupled to the main body housing;
   a driving motor coupled to the support structure and including a rotation shaft;
   a moving member coupled to the driving motor, configured to linearly move along the rotation shaft according to operation of the driving motor; and
   a locking arm physically coupling the pop-up module and the moving member.

3. The electronic device of claim 2, wherein one end of the locking arm is coupled to the moving member and rotatable about a hinge axis, and a second end of the locking arm is coupled to the pop-up module, and
   wherein the locking arm is detachably coupled to the pop-up module, according to whether a rotation occurs.

4. The electronic device of claim 3, wherein the pop-up module further including a locking pin that is detachable from the locking arm, wherein one end of the locking pin is coupled to the pop-up module, and the second end of the locking arm is detachably coupled to the locking arm.

5. The electronic device of claim 4, wherein the locking pin includes:
   a cylindrical locking body; and a protrusion disposed at an end of the cylindrical locking body.

6. The electronic device of claim 3, wherein the locking arm further includes a planar structure which constricts the locking arm into a horizontal position state at a maximum degree of rotation.

7. The electronic device of claim 6, wherein the moving member further comprises a second elastic body providing elastic force by which the locking arm is maintained in the horizontal position state, and
   wherein one end of the second elastic body is fixed to the moving member, and a second end of the second elastic body contacts the locking arm.

8. The electronic device of claim 7, wherein the moving member further includes an assembly groove into which the one end of the second elastic body is fixed.

9. The electronic device of claim 2, wherein the support structure further includes a guide rod disposed parallel with the rotation shaft, the guide rod is coupled to the moving member to guide balanced reciprocal movement of the moving member.

10. The electronic device of claim 5, wherein the unlocking unit includes:
   a first inclined face oriented toward the locking arm in a first direction corresponding to extension of the pop-up module; and
   a second inclined face oriented toward the locking arm in a second direction opposite to the first direction of the first inclined face.

* * * * *